United States Patent

Seifert et al.

[15] 3,668,192

[45] June 6, 1972

[54] CROSS-LINKED ISOTACTIC POLYBUTENE-1

[72] Inventors: Friederich Seifert, Marl; Josef Bittscheidt, Datteln; Johannes Plenikowski, Marl, all of Germany

[73] Assignee: Chemische Werke Huls A.G., Marl, Germany

[22] Filed: Mar. 12, 1970

[21] Appl. No.: 26,464

Related U.S. Application Data

[62] Division of Ser. No. 553,014, May 26, 1966, Pat. No. 3,546,326.

[30] Foreign Application Priority Data

May 28, 1965 Germany..............................C 35 9791

[52] U.S. Cl............................260/79.5 P, 260/785, 260/793, 260/795, 260/797, 264/176, 260/94.9 A
[51] Int. Cl. ..........................................................C08f 27/00
[58] Field of Search.....................260/79.5 P, 79.5 GA, 94.9, 260/775

[56] References Cited

UNITED STATES PATENTS

| | | | |
|---|---|---|---|
| 3,159,596 | 12/1964 | Falcone | 260/41 |
| 3,329,647 | 7/1967 | Serniuk | 260/41 |
| 3,329,649 | 7/1967 | Wei | 260/41 |
| 3,406,732 | 10/1968 | Milano | 152/330 |
| 3,477,985 | 11/1969 | Bucci | 260/41 |

FOREIGN PATENTS OR APPLICATIONS 715,153  8/1965  Canada..............................260/94.9

*Primary Examiner*—Joseph L. Schofer
*Assistant Examiner*—C. A. Henderson, Jr.
*Attorney*—I. William Millen, M. Ted Raptes and John L. White

[57] ABSTRACT

Isotactic polybutene-1 is cross-linked with sulfur and an organic peroxide which decomposes at 140–220°C, e.g., dicumyl-peroxide.

9 Claims, No Drawings

CROSS-LINKED ISOTACTIC POLYBUTENE-1

This application is a divisional application of parent application, Ser. No. 553,014, filed May 26, 1966 now U.S. Pat. No. 3,546,326 issued Dec. 8, 1970. The same claim of priority is made for this application as was made in the parent application, the certified copy of German application C 35 979IVc/39b of May 28, 1965, being located in the file of the parent application.

This invention relates in general to a process of shaping crystalline synthetic resins, and more particularly to a novel process of initiating cross-linking of polybutene-1 during the extrusion thereof.

It has been conventional heretofore to effect cross-linking of polyethylene and the higher homologs thereof, i.e., isotactic polypropylene, and poly-α-butene, with the aid of peroxides (German Published applications No. 1,187,789 and 1,186,210). When these higher homologs are cross-linked, however, it should be accomplished with a mixture of aromatic, polymerizable hydrocarbon monomers containing a predominant amount of divinyl benzene, in combination with saturated arylalkyl hydrocarbons.

Such cross-linkable polymers can be compression-molded with ease, but due to their high viscosity they cannot be easily shaped by conventional continuous thermoplastic processing techniques, such as the extrusion of tubes or cable jackets. To overcome the difficulties in extruding cross-linkable polyethylene, it has been proposed to provide special features, such as a high-frequency field about the extruder head. However, since polyethylene is an apolar synthetic resin, it remains unaffected by the alternating field, it being therefore necessary to employ substantial amounts of carbon black in the polymer. Consequently, hydrocarbon polymers which are not loaded with conductive fillers cannot be extruded satisfactorily by this special method.

In German Patent No. 953,744, it is disclosed that polyisobutylene can be hardened with sulfur and tert.-butyl peroxide, if desired in the presence of an accelerator. Owing to the rubbery non-crystalline characteristics of the products, it would not be expected that they could be shaped by simple continuous thermoplastic processing techniques, since the general rule is that rubbery polymers must be processed by the methods developed in rubber technology. This expectation is universal where vulcanization of the polymer is conducted at high temperatures without any substantial internal flow within the shaped mass.

To produce a cross-linked polymer of polybutene-1, it has been disclosed that it is necessary to employ a peroxide cross-linking agent with other monomers such as divinyl benzene (German Published application No. 1,186,210), inasmuch as peroxides per se do not work satisfactorily. Despite the crystallinity of the polybutene-1, the vulcanizable mixture of the divinyl benzene and peroxide was vulcanized in a heated compression mold. As a matter of interest, owing to the difficulties in continuously processing vulcanizable polyethylene, it was to be expected that similar processing difficulties would be experienced with any attempts to shape cross-linkable polybutene-1 in a continuous manner.

It is, therefore, a principal object of the present invention to provide an improved method of continuously extruding a vulcanizable mixture of polybutene-1.

Another object of this invention is to provide a novel vulcanizable mixture of polybutene-1.

Still another object of this invention is to provide a novel device for use in the extrusion of cross-linkable, thermosetting synthetic resins.

These and other objects and advantages of the present invention will become apparent by reference to the following description, claims, and attached drawing.

To attain the objects of this invention, it has been unexpectedly found that isotactic polybutene-1 can be simultaneously cross-linked and extruded into any desired shape by incorporating therein an organic peroxide, preferably 0.005 to 2 percent by weight; sulfur, preferably 0.05 to 4 percent by weight; in the optional presence of an accelerator, preferably 0.1 to 2 percent by weight; and by heating the resultant mass as it passes through the nozzle of the extruder to a temperature at which the peroxide decomposes and initiates cross-linking. Parts by weight are based on isotactic polybutene-1.

Isotactic polybutene-1 is particularly suitable for use herein and desirably has an average molecular weight of 500,000 to 5,000,000, preferably 1,000,000 to 3,000,000; these molecular weights correspond to a specific reduced viscosity ($\eta_{red}$) of about 1 to 10, preferably 2 to 6. These isotactic polymers can be obtained according to conventional methods of stereospecific polymerization, such as described in "Linear and Stereoregular Addition Polymers," by Gaylord and Mark, Interscience Publishers, Inc., N.Y. (1959), and elsewhere.

Preferably, suitable isotactic polybutene-1 materials are produced by the Ziegler-Natta-process.

The organic peroxides of this invention must be capable of reacting with the polymeric chains as they are passed through the nozzle. Preferably, the peroxides must be reactive at temperatures below 250° C., more preferably in the range of 130° C. to 220° C. Such peroxides can be symmetrical or asymmetrical, and can be substituted by aliphatic, aromatic, or cycloaliphatic groups, preferably hydrocarbon groups of one to 10, seven to 12, and six to 10 carbon atoms, respectively. Examples of specific peroxides are dicumyl peroxide, dibenzoyl peroxide, tert.-butyl perbenzoate, tert.-butyl-α-cumyl peroxide, di-tert.-butyl peroxide, dibenzyl peroxide, bis-(tert.-butyl-peroxymethyl)-durene, 2-,5-dimethyl-2-,5-peroxy-3-hexyne (containing a triple bond) 2-,5-dimethyl-2-,5-diisopropylperoxy-hexane, diisopropyloxy-hexane, 2,2-bis-(tert.-butyl-peroxy)-butane, or isopropylidene-2,5-dimethylhexane-2,5-diperoxide. Although the above-mentioned peroxides are preferred, other organic peroxides can be used; the criterion is that they remain 80 percent stable at temperatures up to at least 110° C., and decompose when heated to about 140° to 220° C.

The sulfur to be used can be in any crystalline state, although it is preferred to employ flowers of sulfur (refined by sublimation).

Suitable accelerators which can be used are, for example, diphenyl guanidine, di-o-toluyl guanidine, mercaptobenzothiazole, tetramethyl thiuram-mono- or disulfide, crotone vinylidenetetramine, zinc benzothiazole mercaptide, or zinc oxide with stearic acid.

In preferred embodiments of this invention, there are employed as additives to the polybutene-1 the following combinations of materials:

a. 0.05 to 1 percent by weight of a peroxide selected from the group consisting of 2-,5-dimethyl-2,5-peroxy-3-hexine, 2-,5-dimethyl-2,5-diisopropylperoxy-hexyne, isopropylidene-2,5-dimethyl-hexane-2,5-diperoxide, and mixtures thereof;

b. 0.2 to 0.5 percent by weight of sulfur; and optionally c. 0.3 to 0.8 percent by weight of an accelerator selected from the group consisting of mercaptobenzothiazole, tetramethyl thiuram-disulfide, and mixtures thereof, or d. 1 to 2 percent by weight of zinc oxide with 0.1 to 0.5 percent by weight of stearic acid, and/or e. zinc benzothiazole mercaptide are added for even better results.

The particular amount of these additives to be used in any case is dependent upon the molecular weight of the polybutene-1 which is employed.

In addition to the above-described additives, there can also be incorporated conventional antioxidants, such as ionol (2,6-di-tert.-butyl-4-methyl-phenol), 4,4'-thiobis-(6-tert.-butyl-3-methyl-phenol) or N-stearoyl-p-aminophenol (see also Kirk-Othmer, "Encyclopedia of Chemical Technology," Second Edition, Volume 2, pp. 599–601); mold release agents, such as calcium stearate, or also sodium stearate (0.5 to 0.3 percent); pigments, such as titanium dioxide, cadmium sulfide, carbon black; and fillers, for example 10 to 20 percent of chalk.

It has been found to be particularly advantageous to incorporate in the polymer 20 to 60, preferably 23 to 40 percent by weight of carbon black, such as channel black, furnace black, or furnace thermal black. The use of carbon black not only lowers the surface resistance of the cross-linked finished products from $10^{13}$ to values below $10^8$ Ω, but also effects permanent destaticization of these products.

The several aforementioned additives can be admixed with the polybutene-1 individually in any order, or in any concentration. It is, however, necessary to maintain the temperature of the polymer during mixing below the decomposition temperature of the peroxide employed, usually not above 120° C. when agglomerating, 160° C. when extruding the mixture. Should the temperature of the polymer during the mixing step be above the decomposition temperature of the peroxide, it is then desirable to add the peroxide during the last phase of the subsequent granulation process.

In practice, the various additives are incorporated into particles of the polybutene-1 having a diameter of 40 to 600 μ, preferably 100 to 500 μ. Since blockage of the screw in the extruder can occur when using fine-mesh particles, it is therefore desirable first to increase the size of these particles by agglomerating the same. This process can be carried out in a heated mixing vessel; sintering takes place at temperatures between 110° C and 120° C., resulting in particles of a diameter of 400 to 1000 μ.

Instead of this process it is possible to produce a granulate by extruding the mixture at temperatures between 140° and 160° C., cutting the so formed worm into particles having an average particle size of 2 to 5 mm.

After passing one of these processes, there is obtained a vulcanizable polymer of polybutene-1 in a form that may be loaded into a feed hopper, whence the particles fall into the cylinder of the extruder to provide a continuous feed. As the particles move forward in the thread of the screw, the temperature thereof rises due to the heated walls of the cylinder and also on account of the friction developed within the polymer as a result of the combination of the rotation and the compression due to the packing action of the screw. Thus, as the particles of polybutene-1 advance through the cylinder toward the die, they become transformed from a mass of granules into a continuous homogeneous plasticized mass which is readily forced through the orifice to accept the desired shape.

Although we do not intended to bound by an explanation of the cross-linking, it is believed that the peroxides, in combination with the sulfur, acts as a free radical donor to polybutene-1 chains by removing a hydrogen and providing a free radical in the chain. These free radicals are then capable of cross-linking polybutene-1 chains. Since even peroxides decomposing at high temperatures, such as 2-,5-dimethyl-2-,5-diisopropyl-peroxy-hexane, or isopropylidene-2,5-dimethyl-hexane-2,5-diperoxide, decompose at elevated temperatures and can initiate premature cross-linking, it is preferred to maintain the temperature of the polymer mass as low as feasible within the boundaries of good extrusion conditions as it is moved forward by the screw in the plasticizing zone of the extruder. Since the peroxide begins to decompose even at 160°–180° C., it is particularly desirable to minimize the residence time of the polymer at such temperatures and higher as it passes through the screw section, preferably on the order of 3 to 5 minutes. The residence time in the nozzle is generally on the order of 1.5 to 3 minutes.

As the compressed and plasticized polymer emerges from the compression zone of the extruder, it is passed into the nozzle section wherein it is further heated to a temperature at which the peroxide decomposes and initiates the complete cross-linking of the polymer. Although the initiation of cross-linking can depend, in part, upon the particular machine employed, e.g., the construction of the screw, the length of the screw, compression ratio, shape of nozzle, and rotational speed of the screw, it has been found that the desired cross-linking can be realized by continuously elevating the temperature of the mass from the plasticizing zone (130–180° C.) to the nozzle to about 180–240° C; the temperature of the polybutene-1 is, on the average, about 10° to 30° higher than those temperatures otherwise employed when working polybutene-1.

In another embodiment of this invention, polybutene-1 in admixture with the aforementioned additives can be readily shaped in discontinuous processes, such as in compression molds. In such cases, the granulated polymer mixture is charged into the mold and heated for about 1–2 minutes at 180°–190° C., whereupon the shaped article can be removed from the mold without the danger of deformation after being cooled.

The favorable properties of the novel molded masses are particularly surprising because polybutene-1 is subjected to chain scission by peroxide by itself, but not cross-linked, and because sulfur, even in the presence of accelerators, likewise does not effect cross-linking. This is in contradistinction to, for example, the effectiveness of these substances in polyethylene or in ethylene-propylene rubber wherein the peroxide by itself has a cross-linking effect. In such cases sulfur is not required but serves merely as an additive which improves certain properties, such as the durability of the cross-linkages or the time for reaching the final degree of vulcanization while at the same time sulfur deleteriously affects other properties, such as heat-age resistances and compression set.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In this example, the compositions of polybutene-1 designated below as mixtures I, Ia and Ib, and wherein I contains neither sulfur nor peroxide (only carbon black and antioxidants); Ia contains an addition of a sulfur, accelerator and activator but no peroxide; and Ib contains an addition of peroxide but without the sulfur system of In. A mixture of polybutene-1 containing both the sulfur system of Ia and the peroxide of Ib is designated below as mixture II and was also prepared to illustrate the advantages of the compositions of the present invention.

Mixture I
  100 parts by weight of polybutene-1 ($\eta_{rod}$ —4.5)
  1.5 parts by weight of thermal black
  0.1 parts by weight of 4,4'-thiobis-(3-methyl-6-tert.-butylphenol)
  0.1 parts by weight of dilauryl thiodipropionate Mixture Ia
  Corresponds to mixture I; additionally, it contains
  0.3 parts by weight of sulfur
  0.3 parts by weight of tetramethyl thiuras-disulfide
  0.15 parts by weight of mercaptobenzothiazole
  0.2 parts by weight of stearic acid
  1.5 parts by weight of zinc oxide Mixture Ib
  Corresponds to mixture I; additionally, it contains
  0.5 parts by weight of 2-,5-dimethyl-2-,5-peroxy-hexane Mixture II:
  100 parts by weight of polybutene-1 ($\eta_{rod}$—4.5)
  1.5 parts by weight of thermal black
  0.1 parts by weight of 4,4'-thiobis-(6-tert.-butyl-m-cresol)
  0.1 parts by weight of dilauryl thiodipropionate
  0.5 parts by weight of 2-,5-dimethyl-2,5-peroxy-hexane-diisopropyl
  1.5 parts by weight of zinc oxide
  0.2 parts by weight of stearic acid
  0.3 parts by weight of tetramethyl thiuram-disulfide
  0.15 parts by weight of mercaptobenzothiazole
  0.3 parts by weight of sulfur Each of the mixtures is produced from the powdered materials in a high-speed mixer at room temperature, and then, during the course of about 10 to 15 minutes, the temperature is either raised to about 110° to 120° C. for the purpose of producing an agglomerate, or the powdered mixture produced at room temperature is granulated between 160° and 180° C., as already described above.

Thereupon, the granulate is cooled and then charged into the feed hopper of an extruder having a 15 D Short Compression screw, a compression ratio of 1 : 3, and a speed of rotation of about 30 r.p.m. As the mixture at 190° C. passed from the screw section or plasticizing zone to the nozzle zone, the temperature of the mixture increases to 230° C., the plastic mass passing through the die is formed into tubes having an outside diameter of 32 mm and a wall thickness of 3 mm. The extrusion of mixture 1b did not produce satisfactory tube material owing to extensive chain scission of the polymer (lowering of the $\eta_{red}$ value below 2). Consequently, the permanent stability thereof could not be determined.

To determine the permanent stability of the tubes produced from mixtures I and II, they were subjected to a continuous stress at 90° C. and a σ-value of 60 at 12 atmospheres gauge, this test being conducted analogously to DIN 8074 and din 8075 for polyethylene. The surface resistance values of the tubes were also determined according to DIN 53 482/VDE 0303, Part 3.

By comparing the results of these tests, as shown in Table I, it can be seen that the permanent stability of the tubes measured at a $\eta_{red}$ value of 60, and 90° C., increases due to cross-linking, from an average of 4,300 hours to an average of 7,750 hours.

Moreover, the cross-linked polybutene-1 tubes produced from mixture II exhibit only a slight softening at about above 200° C. in comparison to the molting range of the extruded non-cross-linked polymers of mixtures I, Ia and Ib of 124°–130 ° C.

The solvent stability of pressed plates produced from the mixtures designated in Table I was also determined by immersing the same in boiling toluene over a period of 2 hours. Only about 10 percent by weight of the plates produced from mixture II are dissolved, while corresponding samples produced from mixtures I, Ia, and Ib, under the same conditions, are almost completely dissolved.

In addition to the production of tubes as described above, the vulcanizable polymers of the present invention can be extruded or otherwise formed into any desired shape.

EXAMPLE 2

To further illustrate the utility of the cross-linking agents of the present invention, additional compositions of polybutene-1 designated as mixtures III and IV were prepared by increasing the amount of carbon black in the basic mixtures I and II described in Example 1, to 25 parts by weight of a furnace black (98% C, 0.3% H, 0.1% N, 0.7% S, and 0.9% O) per 100 parts by weight of polybutene-1. These mixtures are then extruded and the resultant tubing tested according to the procedure described in Example 1. It can be seen from Table I that the increased concentration of furnace black in mixtures III and IV yields extruded tubing which is permanently antistatic (surface resistance below $10^8$ Ω). The measured permanent stability of the tubes produced from mixture III is significantly lower than the permanent stability of the cross-linked tube produced from mixture IV. As shown in Table I, it can be seen that the permanent stability increases due to cross-linking, from an average of 4.300 hours to an average of 7.800 hours.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A vulcanizable polymeric mass comprising uncross-linked isotactic polybutene-1 and vulcanizing amounts of a vulcanizing agent consisting of sulfur and an organic peroxide which is reactive with said polybutene-1 and sulfur at temperatures below 250° C., said uncross-linked isotactic polybutene-1 being essentially uncross-linkable by said organic peroxide alone.

2. A polymeric mass as defined by claim 1 wherein there are employed 0.005 to 2 percent by weight of an organic peroxide, and 0.05 to 4 percent by weight of sulfur.

3. A polymeric mass as defined by claim 2, further comprising an accelerator selected from the group consisting of mercaptobenzothiazole, tetramethyl thiuram-disulfide, and mixtures thereof.

4 A polymeric mass as defined by claim 1 wherein there is incorporated from 20 to 60 percent by weight of carbon black.

5. A polymeric mass as defined by claim 1 wherein said organic peroxide is dicumyl peroxide, dibenzoyl peroxide, tert.-butyl perbenzoate, tert.-butyl-α-cumyl peroxide, di-tert.-butyl peroxide, dibenzyl peroxide, bis-(tert.-butyl-peroxy-methyl)-durene, 2-,5-dimethyl-2-,5-peroxy-3 -hexine, 2-,5-dimethyl-2-,5-diisopropyl-peroxy-hexane, 2,2-bis-(tert.-butyl-peroxy)-butane, or isopropylidene-2,5-dimethylhexane-2,5-diperoxide.

6. A polymeric mass as defined by claim 2 wherein said organic peroxide is dicumyl peroxide, dibenzoyl peroxide, tert.-butyl perbenzoate, tert.-butyl-α-cumyl peroxide, di-tert.-butyl peroxide, dibenzyl peroxide, bis-(tert.-butyl peroxy-methyl)-durene, -peroxide, 2-,5-dimethyl-2-,5-peroxy-3-hexine, 2-,5-dimethyl-2-,5diisopropyl-peroxy-hexane, 2,2-bis-(tert.-butyl-peroxy)-butane, or isopropylidene-2,5-dimethylhexane-2,5-diperoxide.

7. A polymeric mass as defined by claim 3 wherein said organic peroxide is dicumyl peroxide, dibenzoyl peroxide, tert.-butyl perbenzoate, tert.-butyl-α-cumyl peroxide, di-tert.-butyl peroxide, dibenzyl peroxide, bis-(tert.-butylperoxy-methyl)-durene, peroxide, 2-,5-dimethyl2-,5-peroxy-3-hexine, 2-,5dimethyl-2-,5-diisopropyl-peroxy-hexane, 2,2-bis-(tert. - butyl-poroxy)-butane, or isopropylidene-2,5-dimethylhexane-2,5-diperoxide.

8. A polymeric mass as defined by claim 1, said organic peroxide being present in a concentration of 0.05–1 percent by weight, and being selected from the group consisting of 2-,5dimethyl-2, 5-peroxy-3-hexyne, 2-,5-dimethyl-2,5-diisopropylperoxy-hexane, isopropylidene-2,5-dimethyl-hexane-2,5-diperoxide, and mixtures thereof, and said sulfur being present in a concentration of 0.2–0.5 percent by weight.

TABLE I.—COMPARISON OF PERMANENT STABILITY VALUES OF TUBING MADE FROM CROSS-LINKED AND NOT CROSS-LINKED POLYBUTENE-1

Test at 12 atmospheres gauge, 90° C., σ-value 60

| Mixture | I | Ia | Ib | II | III | IV |
|---|---|---|---|---|---|---|
| Permanent stability (hours) at σ 60° C and 90° C | 4,100–4,500 | 4,100–4,500 | Omitted | 7,600–7,900 | 4,100–4,500 | 7,600–8,000 |
| Surface resistance in Ω according to DIN 53462/VDE 0303, part 3 | $10^{13}$ | $10^{13}$ | $10^{13}$ | $10^{13}$ | $10^6$ | $10^6$ |

The preceding examples can be repeated with similar success by substituting the generically and specifically described reactants and operating conditions of this invention for those used in the preceding examples.

9. A polymeric mass as defined by claim 1 wherein said organic peroxide is 80 percent stable at up to at least 110° C., and decomposes when heated to about 140°–220° C.

* * * * *